US005671108A

United States Patent [19]
Clausen

[11] Patent Number: 5,671,108
[45] Date of Patent: Sep. 23, 1997

[54] TAPE DRIVE CLEANER

[75] Inventor: E. Clausen, Bellingham, Wash.

[73] Assignee: Allsop, Inc., Bellingham, Wash.

[21] Appl. No.: 520,683

[22] Filed: Aug. 29, 1995

[51] Int. Cl.⁶ .................................................. G11B 5/41
[52] U.S. Cl. ............................................................ 360/128
[58] Field of Search .................................. 360/128, 137;
15/DIG. 12

[56] References Cited

U.S. PATENT DOCUMENTS

| D. 276,607 | 12/1984 | Clausen et al. | D14/11 |
|---|---|---|---|
| 3,439,922 | 4/1969 | Howard | 360/137 |
| 3,636,276 | 1/1972 | Rose | 360/93 |
| 3,655,924 | 4/1972 | Puskas | 360/128 |
| 3,717,855 | 2/1973 | Van Acker | 360/128 |
| 3,761,994 | 10/1973 | Becht | 15/210.1 |
| 3,783,470 | 1/1974 | Myers et al. | 15/210.1 |
| 3,881,195 | 4/1975 | Ono et al. | 360/128 |
| 3,955,214 | 5/1976 | Post et al. | 360/128 |
| 4,141,053 | 2/1979 | Kara | 360/128 |
| 4,149,206 | 4/1979 | Loiselle | 360/128 |
| 4,225,893 | 9/1980 | Loiselle | 360/28 |
| 4,272,796 | 6/1981 | Van Kreuningen et al. | 360/128 |
| 4,442,468 | 4/1984 | d'Alayer de Costemore d'Arc | 360/128 |
| 4,454,550 | 6/1984 | Clausen et al. | 360/137 |
| 4,454,551 | 6/1984 | Clausen et al. | 360/137 |
| 4,458,281 | 7/1984 | Kara | 360/128 |
| 4,594,629 | 6/1986 | d'alayer de Costemore d'Arc | 360/128 |
| 4,631,614 | 12/1986 | Davis et al. | 360/128 |
| 4,631,616 | 12/1986 | Zago et al. | 360/128 |
| 4,669,017 | 5/1987 | Blank et al. | 360/128 |
| 4,698,712 | 10/1987 | Fritsch | 360/128 |
| 4,751,600 | 6/1988 | Cecil et al. | 360/128 |
| 4,761,700 | 8/1988 | Fritsch | 360/128 |
| 4,763,216 | 8/1988 | Solhjell et al. | 360/128 |
| 4,775,910 | 10/1988 | Rudi | 360/128 |
| 4,803,583 | 2/1989 | Bogdanski | 360/128 |
| 4,816,952 | 3/1989 | Clausen | 360/128 |
| 4,825,319 | 4/1989 | Andreas | 360/128 |
| 4,843,508 | 6/1989 | Mannheimer et al. | 360/128 |
| 4,851,945 | 7/1989 | Fritsch et al. | 360/128 |
| 4,855,855 | 8/1989 | Stanton | 360/128 |

(List continued on next page.)

FOREIGN PATENT DOCUMENTS

| 210 787 | 2/1987 | European Pat. Off. |
| 0 309 398 | 3/1989 | Germany . |
| 0 439 375 | 7/1991 | Ireland . |
| 58-100254 | 6/1983 | Japan . |
| 2 232 804 | 12/1990 | United Kingdom . |
| 2 239 731 | 7/1991 | United Kingdom . |

*Primary Examiner*—Jefferson Evans
*Attorney, Agent, or Firm*—Christensen O'Connor Johnson & Kindness PLLC

[57] ABSTRACT

An apparatus for cleaning a tape drive unit having a read and/or write head and a capstan is disclosed. The apparatus includes a housing, a drive mechanism, and a cleaner arm. The drive mechanism includes a drive wheel, a drive gear, an intermediate gear, and a cylindrical cam, all interconnected. The housing is arranged and configured to be received within the tape drive unit. The drive wheel is rotatably secured within the housing and engageable with the capstan of the unit for rotation about a substantially vertical axis. The cam is substantially cylindrical and is rotatably secured within the housing. The cleaner arm is pivotally secured within the housing about an axis generally parallel to the bottom wall of the housing. The cleaner arm includes a tab extending rearwardly that is engaged with the cam. The cleaner arm includes a cleaning element arranged and configured for engagement with the head of the tape drive unit and for vertical movement against the head for cleaning. An alternate apparatus for cleaning a tape drive unit is also disclosed that allows a reciprocating pad to move across the head of the tape drive unit in only one direction. The apparatus includes a housing, a reciprocating carriage, and a drive mechanism. The reciprocating carriage follows a circular path due to grooves being placed within the housing.

25 Claims, 3 Drawing Sheets

U.S. PATENT DOCUMENTS

| | | | |
|---|---|---|---|
| 4,875,125 | 10/1989 | Joannou et al. | 360/128 |
| 4,894,743 | 1/1990 | Clausen | 360/128 |
| 4,918,557 | 4/1990 | Lee | 360/128 |
| 5,021,911 | 6/1991 | Kingsbury | 360/128 |
| 5,021,912 | 6/1991 | Shao-Yung | 360/128 |
| 5,170,304 | 12/1992 | Katohno et al. | 360/128 |
| 5,309,307 | 5/1994 | Fritsch et al. | 360/128 |
| 5,420,737 | 5/1995 | Clausen | 360/128 |

TAPE DRIVE CLEANER

FIELD OF THE INVENTION

The present invention relates to an apparatus for cleaning a tape drive machine and, more particularly, to an apparatus adapted for cleaning a read and/or write head of a machine that is adapted to operate on a tape cassette containing a magnetic tape.

BACKGROUND OF THE INVENTION

There are various machines that operate to receive information from, or impart information to, magnetic tape. Two such commonly used machines are video player/recorder units and audio player/recorder units. In video units, the magnetic tape is pulled outwardly from a cassette tape cartridge and brought into engagement with a shallow cylindrical surface of a rotating element on which the player/recorder head is carried. In the audio unit, the magnetic tape generally extends across a forward portion of the tape cassette, with the tape being exposed at this forward portion. The tape passes by a stationary player/recorder head, and is also engaged by a capstan and pinch roller of the machine to cause the tape to move along its length.

Various cleaning devices have been proposed to clean the operating surfaces of such player/recorder units. With the video unit, it has been a common practice to provide a cleaning ribbon that is engaged by guide elements in the video player/recorder unit to carry the cleaning ribbon to engagement with the rotating element carrying the player/recorder head and possibly into engagement with other components of the video player/recorder unit.

Another type of cleaning mechanism that is used more commonly with audio player/recorder units comprises a cassette housing that carries a cleaning member that in turn is adapted to carry a cleaning element, such as a pad. This cleaning member is arranged to move on a cleaning path, which in many cleaning devices is a back-and-forth path where it wipes against the player/recorder head of the audio unit. Quite commonly, the cleaning member is driven on its back-and-forth path through a suitable drive transmission from one of the drive spindles in the audio player/recorder unit.

To obtain the proper cleaning action, it is desirable to have adequate frictional engagement between the cleaning pad and the surface of the player/recorder head of the audio unit. However, if the force of the frictional engagement is excessive, then the resistance imparted back through the drive transmission to the drive sprocket may trigger the automatic shutoff mechanism in the machine.

Another concern is that the operating surface of the player/recorder head is quite often not a flat surface, but a moderately curved surface. Also, in some instances, the operating surface of the head may be a compound curved surface, having two or more curved side portions, with a moderate recess between the curves, or with ridges and small crevices. This may have a tendency to create a resisting force against the cleaning pad greater than that that would normally be encountered simply from frictional engagement.

With regard to the problem of the cleaning element being caught or snagged on the surface of the player/recorder head (e.g., possibly being engaged by a side surface portion of the head so as to create a relatively large resistance to the back-and-forth movement of the cleaning element), one approach to this problem, as shown in U.S. Pat. No. 4,454,551 (Clausen et al.), is to provide the arm that carries the cleaning pad with a spring having a somewhat "Z" configuration, where the spring has two oppositely positioned U-shaped spring sections.

In yet other instances, the cleaning element is mounted to a carriage that, instead of a pivot motion, has a linear side-to-side motion, with the carrier or carriage for the cleaning pad having a laterally extending member mounted between pins. An example of this is shown in U.S. Pat. No. 4,442,468 (d'Alayer de Costemore d'Arc).

In addition to video and audio player/recorder units, there are also tape drives that move a magnetic tape relative to read/write head so that data can be taken from the tape or transmitted to the tape. Common drives are provided a read/write head that is positioned at a front location relative to the tape cassette, and the operating surface of this head has a pair of vertically oriented ridges that protrude outwardly from the operating surface a short distance. With regard to cleaning such a read/write head, for example by a back-and-forth motion of a pad, these ridges aggravate the problem of the cleaning pad encountering an excessive resisting force by the pad coming into engagement with the side surfaces of these ridges.

This is the case with many heads of ¼ inch tape backup drives. The head includes a single sharp vertical ridge running transverse to the normal cleaning path of a head cleaning pad. In this tape drive machine, there is a drivewheel (i.e., a capstan) that engages a drive element in the tape cassette to cause movement of the tape. The operation of the machine is such that the motion imparted to the tape is a somewhat erratic back-and-forth motion.

In U.S. Pat. No. 4,816,952 (Clausen) there is described a cassette cleaner to clean the read/write head of the tape drive machine. There is a cassette housing having a carriage mounted for lateral back-and-forth movement in the housing. The carriage has a slot-and-pin mounting at a left forward location, and a cleaning pad at a right forward location, with a gear and cam transmission to cause the lateral back-and-forth motion of the carriage. Power to the gear and cam transmission is supplied by a drivewheel 78 that engages a roller or drive capstan 16, which is a component of the tape drive machine.

However, these prior systems, while providing numerous advances, may not be adequate to avoid hangups and provide complete cleaning with drives such as some ¼ tape backup drives that include a vertical ridge on the head. Cleaning pads may easily be hung up or may not clean well the areas next to the ridge. Excessive resistance on the cleaning pad may switch off the drive. Therefore, owing to the drawbacks of the above-described devices in cleaning heads that include vertical ridges and other obstructions, the present invention was developed. The devices of the present invention effectively clean head surfaces that include ridges or other obstructions to the path of a cleaning pad.

SUMMARY OF THE INVENTION

The present invention overcomes the difficulties encountered in the prior art for cleaning head surfaces that include irregularities or ridges, by providing and apparatus that includes a housing, a drive wheel, and a head cleaner. The housing includes top, bottom, side, forward, and rearward walls and is configured to be received within the tape backup drive. The drive wheel is engageable with the capstan. The drive wheel is rotatably secured within the housing about a generally vertical axis. The head cleaner is movably secured within the housing and includes a cleaning element that moves vertically as the head cleaner moves. The head cleaner is operatively engaged to the drive wheel for movement when the drive wheel moves in response to engagement with the capstan of the tape backup drive.

Preferably a cylindrical cam is rotatably secured within the housing and slidably engaged with the head cleaner to cause movement of the head cleaner. A cam pulley is secured to the cam for rotation therewith and a belt is engaged on the pulley and coupled to the drive wheel. Alternatively, a cam gear is secured to the cam for rotation therewith, and an intermediate gear is engaged with the cam gear and operatively coupled to the drive wheel.

In the preferred embodiment of the invention the head cleaner comprises a cleaning arm including a first portion pivotally secured to the housing about an axis substantially parallel to the bottom wall of the housing. The first portion includes a tab engaging the cam. The second portion extends forwardly from the first portion and holds the cleaning element. Preferably, the second portion of the arm is slidable with respect to the first portion. A spring is disposed between the first and second portions to bias the second portion forwardly relative to the first portion.

An alternative apparatus for cleaning the head of a tape drive while avoiding "hang up" is also disclosed. The apparatus includes a housing, a reciprocating carriage, and a drive mechanism. The housing is arranged and configured to be received within the unit. The housing includes top, bottom, side, forward, and rearward walls. At least one of the top and bottom walls includes a first groove therein. The first groove defines a path having both lateral and longitudinal components. The reciprocating carriage includes a cleaning member engageable with the head of the unit. The carriage includes a first guide post engageable with the first groove to follow the path as the carriage reciprocates. The drive mechanism is engageable with the drive element and is coupled to the carriage to move the carriage in a reciprocating path.

Preferably, a second groove is also provided within at least one of the top or bottom walls. The second groove is substantially laterally oriented. The second post extends from the carriage and is engageable with the second groove.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Referring first to FIGS. 1–4, a first preferred embodiment of the present invention will be described, including its parts, interconnections, and functions. An alternate embodiment will be described in connection with FIG. 5, that includes a minor variation from the first embodiment. A separate preferred embodiment of the present invention will then be described in connection with FIGS. 6 and 7. All of the embodiments described herein are suitable for cleaning the head surfaces of tape drive machines. The preferred embodiments illustrated and described herein are specifically adapted for cleaning one-quarter (¼) inch tape backup drives. The operating surface of the ¼ inch tape backup drive has an irregular surface including a sharp ridge that runs vertically, or transverse, to the orientation of the tape. As discussed in the background of the invention, this ridge may cause a typical cleaning pad to "hang up" or become destroyed on the ridge itself while cleaning action is being attempted. The embodiments of the present invention overcome the difficulties and limitations of the prior art such as pad hang ups when cleaning an irregular head surface.

Figure 1:
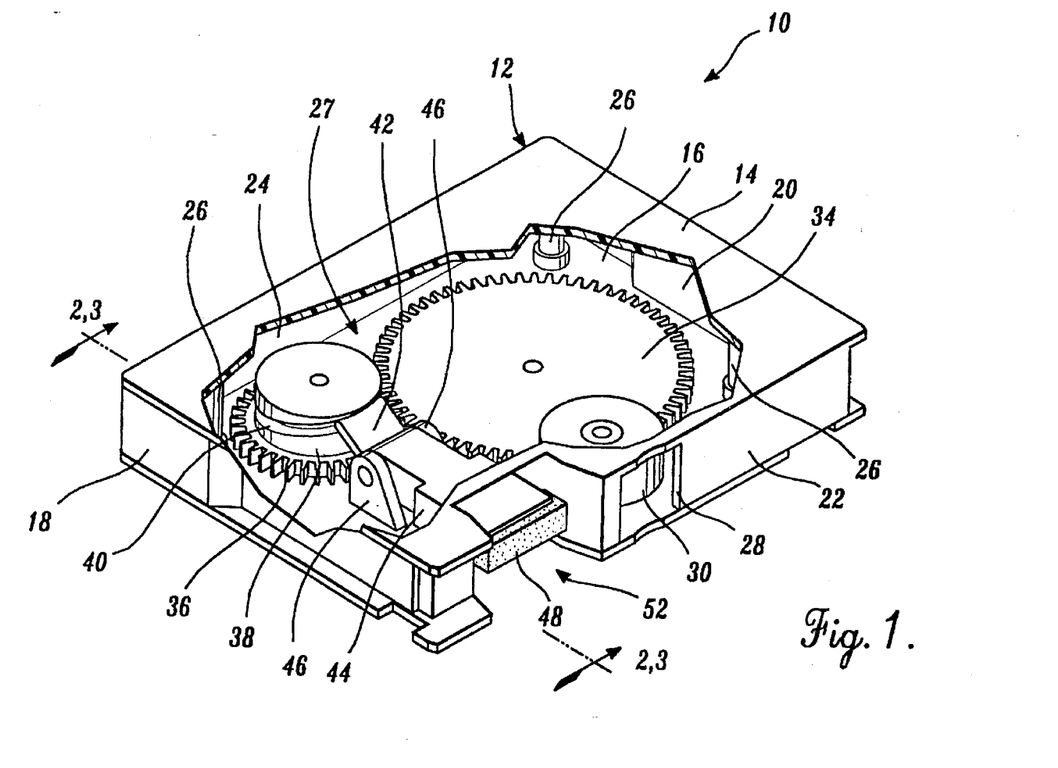
FIG. 1 is an isometric view of an embodiment of the present invention illustrating the internal workings of the cleaner.

The first preferred embodiment of the invention is illustrated in FIG. 1. A cleaning cartridge 10 is adapted to be positioned into a recess in a tape backup drive that typically holds a ¼ inch tape backup cassette. Cleaning cartridge 10 includes a housing 12 with the appropriate proportions and size to fit within the tape backup drive. Housing 12 includes a generally planar top wall 14. A bottom wall 16 is also provided that is substantially the mirror image of top wall 14. Right and left side walls 18 and 20, respectively, as well as front and rear walls 22 and 24, respectively, surround the perimeters of top and bottom walls 14 and 16, and separate top and bottom walls 14 and 16 such that they form substantially parallel planes. Recesses are provided in the sides of right and left side walls 18 and 20. Appropriate openings in recesses are also provided within front wall 22 as described below. Housing assembly posts 26 are located near the corners of housing 12 to interconnect top wall 14, with integrally molded side walls 18 and 20, and front and rear walls 22 and 24, to bottom wall 16.

A drive mechanism 27 is provided within housing 12 to translate motion of a capstan within the tape backup drive cleaner into cleaning motion of a cleaning element in order to clean the head of the tape backup drive. Drive mechanism 27 includes a drive wheel 30, a drive gear 32, an intermediate gear 34, a terminal gear 36, a cam 38, a cleaner arm 44, and a cleaning pad 48.

Drive wheel 30 is positioned rearward of a capstan opening 28 within front wall 22. Capstan opening 28 extends approximately from bottom wall 16 to top wall 14 and is generally rectangular and, more specifically, somewhat square in shape to provide an opening large enough for the capstan of the tape backup drive to extend within when cleaning cartridge 10 is inserted therein. The capstan engages the surface of drive wheel 30. Drive wheel 30 is positioned within a front portion of housing 12 and is mounted for rotation about a vertical axis within housing 12.

Figure 4:
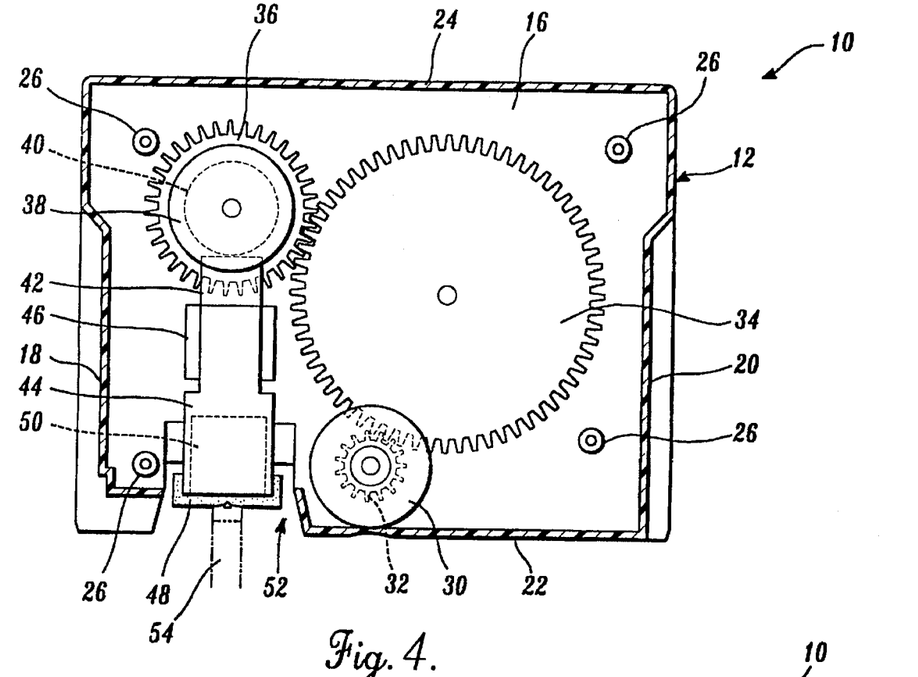
FIG. 4 is a cross-sectional top view of the embodiment illustrated in FIG. 1.

A drive gear 32 is fixed to the bottom of drive wheel 30 such that it rotates therewith about the same axis as drive wheel 30 is rotated by the tape backup drive capstan. The axis is generally parallel to the axis of rotation of the capstan. Drive gear 32 is best illustrated in FIG. 4. Drive gear 32 is preferably smaller in diameter than drive wheel 30, such that it does not interfere with the capstan of the tape backup drive, contacting and driving drive wheel 30 in a circular motion.

An intermediate gear 34 is provided within the middle of housing 12 slightly offset toward left side wall 20. Intermediate gear 34 is large in diameter relative to drive gear 32 in order to transmit the circular motion of drive gear 32 to the other side of housing 12. Alternatively, multiple gears could be employed within housing 12 to transmit the motion of drive gear 32 to the proper location.

In the preferred embodiment, intermediate gear 34 is engaged with terminal gear 36, provided within the right rearward corner of housing 12. Terminal gear 36 is larger in diameter than drive gear 32 in order to accomplish speed reduction. The ratio of the number of teeth of drive gear 32 to terminal gear 36 can be used to determine the exact amount of speed reduction obtained (or the ratio of the diameters of the gears). Speed reduction is desirable since excessive speed of the cleaning pad can cause the pad to provide ineffective cleaning or to become totally dislodged. The drive mechanism 27 also may not function smoothly with excessive speed, whereas the speed of the tape backup drive capstan can be rather high. Terminal gear, as well as intermediate gear 34, and drive gear 32 all rotate about vertical axes perpendicular to bottom wall 16. The bottom faces of these gears are directly adjacent to bottom wall 16.

A cylindrical cam 38 is affixed to the top of terminal gear 36 and rotates about the same axis of rotation as terminal gear 36. The outside diameter of cam 38 is slightly smaller than the diameter of terminal gear 36. Cam 38 includes a cam groove 40 around the outside thereof. Cam groove 40 extends around cylindrical cam 38, gradually from top to bottom of the cylinder and back.

A cam follower 42 is part of cleaner arm 44. Cam follower 42 is a tab with one end extending into cam groove 40 to move up and down therewith as cam 38 rotates. Cam follower 42 is an oscillating follower since cleaner arm 44 and, thus, cam follower 42 is pivotally attached to pivot mount tabs 46 extending upwardly from bottom wall 16. Pivot mount tabs 46 are provided on either side of cleaner arm 44. The axis of the pivotal connection is perpendicular to the axis of rotation of cam 38. Cam follower 42 is integrally molded with cleaner arm 44 such that as cam follower 42 rides within cam groove 40, cleaner arm 44 moves up and down repeatedly.

Cleaner arm 44 extends forwardly within housing 12 toward the front of housing 12. A pad recess 50 is provided within the front of cleaner arm 44 to house the rear end of cleaning pad 48. Housing 12 includes a cleaning member recess 52 into which head 54 of the tape backup drive projects when cleaning cartridge 10 is inserted into the backup drive. Cleaning pad 48 is positioned to contact head 54. Cleaning pad 48 is preferably constructed of an open cell foam such that it can be compressed against head 54.

Figure 2:
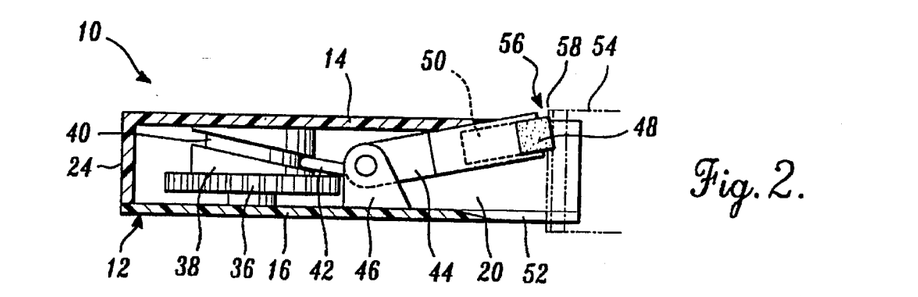
FIG. 2 is a cross-sectional view of the cleaner of FIG. 1 showing the cleaning pad in an uppermost position.
Figure 3:
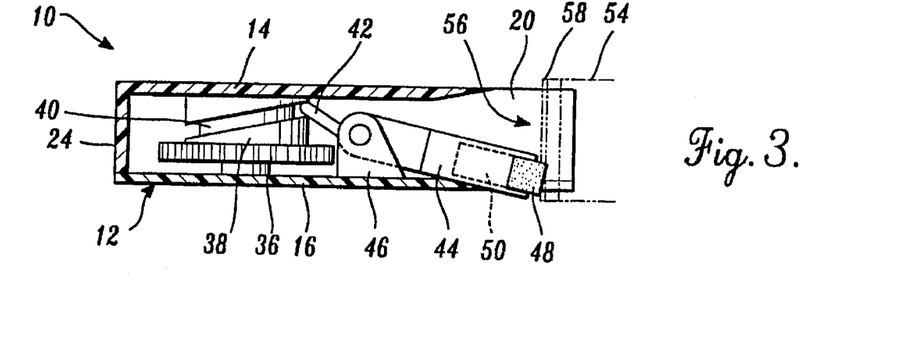
FIG. 3 is a cross-sectional elevational view of the embodiment illustrated in FIG. 1 showing the cleaning pad in a lowermost position.

As seen in FIGS. 2, 3, and 4, head 54 includes an operating surface 56 across which a tape normally rides for transferring data. A somewhat sharp head ridge 58 is provided at operating surface 56. Head ridge 58 extends vertically along operating surface 56. Since cleaning pad 48 is compressible against operating surface 56 as cleaning pad 48 oscillates up and down, it remains in constant contact with operating surface 56, especially head ridge 58.

FIG. 2 illustrates an upwardmost position of cleaning arm 44 and cleaning pad 48, illustrating the extent to which cleaning pad 48 can clean head ridge 58 and operating surface 56. FIG. 3 illustrates the lower limit of the preferred embodiment with cleaning pad 48 at the bottom end of operating surface 56. Note that cam 38 has been rotated 180° from FIG. 2 to FIG. 3. As cam 38 continues to rotate cleaning arm 44 and, thus, cleaning pad 48 move up and down vertically against operating surface 56 to clean operating surface 56 without moving sideways or transverse to head ridge 58. Thus, effective cleaning is accomplished without destruction of cleaning pad 48. Cleaning pad 48 may alternatively be spring biased within arm 44 in a forward direction to ride against operating surface 56. Cleaning arm 44 may alternatively be arranged to translate up and down vertically with a sliding connection to tabs 46 in response to rotation of cam 38. Such would be the case with a cylindrical cam and a translating follower instead of an oscillating follower. Also note that, alternatively, a globoidal cam with an oscillating follower could be used to ensure that oscillating follower 42 did not leave groove 40 at the extreme limits of motion.

In summary, the operation of the preferred embodiment illustrated in FIGS. 1–4 is accomplished by inserting cleaning cartridge 10 within a tape backup drive such that the drive capstan engages drive wheel 30. When the drive capstan rotates, drive wheel 30 is caused to rotate in an opposite direction. Drive gear 32 is affixed to the bottom of drive wheel 30 and, thus, rotates therewith to cause intermediate gear 34 to rotate. Intermediate gear 34 then translates the rotating motion to terminal gear 36. Since cam 38 is affixed to the top of terminal gear 36, it rotates therewith to cause cam follower 42 to oscillate up and down within cam groove 40. Cleaner arm 44, being integrally molded with cam follower 42, likewise moves in an up and down motion such that cleaning pad 48, engaged with operating surface 56 of head 54, cleans operating surface 56. Note that the length of cleaner arm 44 from the pivotal connection to pivot mount tabs 46 is longer than cam follower 42, such that motion is amplified to clean substantially the entire operating surface 56 of head 54. Preferably, the amount of surface cleaned is greater than the area of contact of the ¼ inch tape that runs past operating surface 56 when the tape backup drive is being used in normal operation with a ¼ inch backup tape.

Figure 5:
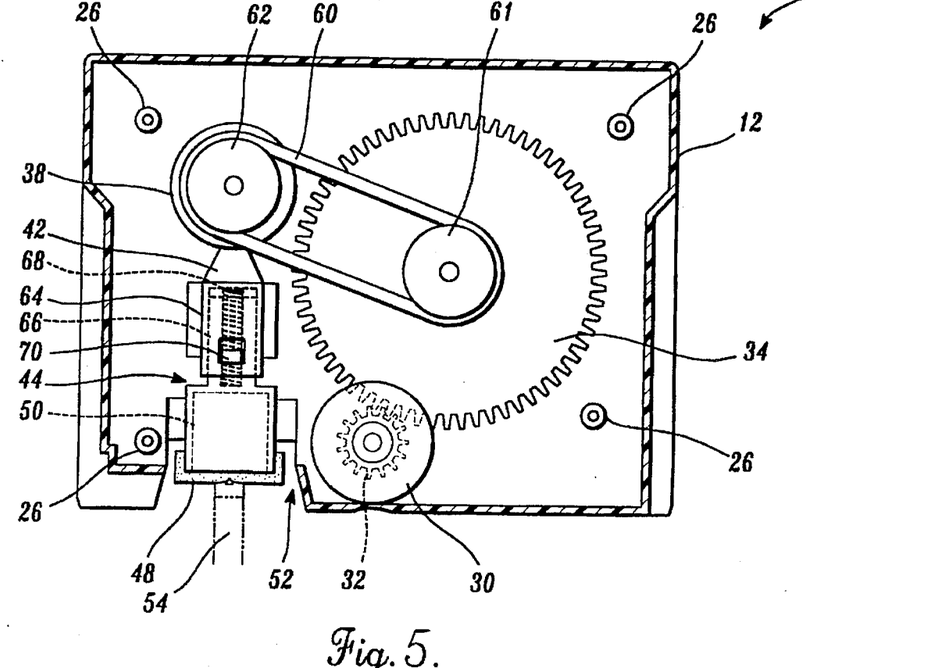
FIG. 5 is a cross-sectional top view of an alternate preferred cleaner of the present invention showing a belt drive and a spring-biased cleaning element.

FIG. 5 illustrates an alternate embodiment of cleaning cartridge 10. In this embodiment, a belt 60 is utilized to transmit the circular motion of intermediate gear 34 to cam 38. A small intermediate pulley 61 is fixed to the top of intermediate gear 34. Intermediate pulley 61 rotates about the same axis as intermediate gear 34. However, the small diameter of intermediate pulley 61 relative to intermediate gear 34 causes a high amount of speed reduction. A terminal pulley 62 is fixed to the top of cam 38 and rotates with the same axis of rotation as cam 311. Belt 60 is trained between intermediate pulley 61 and terminal pulley 62 to transmit the circular motion of intermediate pulley 61 to terminal pulley 62 and, thus, to cam 38.

Note that the ratios of diameters for speed reduction purposes is much higher in this instance than with embodiment illustrated in FIGS. 1–4, such that a greater amount of speed reduction is accomplished. Belt 60 also tends to create less noise than transmission through gears 34 and 36.

Another difference in the construction of this embodiment is in cam follower 42. In the embodiment illustrated in FIGS. 1–4, and described above, cam follower 42 had a somewhat upward tilt relative to the longitudinal axis of cleaner arm 44 in order to ride within groove 40 above terminal gear 36. However, in the embodiment illustrated in FIG. 5, terminal pulley 62 is above cam 38 such that cam follower 42 preferably extends straight from arm 44 to ride within groove 40 which is positioned closer to bottom wall 16 than in the previous embodiment described above.

Cleaner arm 44 is also a two-piece assembly in the embodiment illustrated in FIG. 5. Cleaner arm 44 includes an outer sleeve 64 integrally molded with cam follower 42. Outer sleeve 64 is pivotally attached to pivot mount tabs 46. The pad holding portion of arm 44 includes an inner sleeve 66 slideably engaged within outer sleeve 64 for movement along the longitudinal axis of arm 44. Inner sleeve 66 has an internal opening with a coil spring 68 disposed therein. Spring 68 extends out the rearward end of inner sleeve 66 such that it contacts the closed end of outer sleeve 64 to bias inner sleeve 66, and thus pad 48 forwardly. A retention tab 70 extends upwardly from inner sleeve 66 through an opening in the top of outer sleeve 64. The length of the opening defines the movement limits of inner sleeve 66 and pad 48 and retains inner sleeve 66 within outer sleeve 64. This two part arm arrangement allows pad 48 to be biased against head 54 through the full range of movement of arm 44 to the top and bottom of head 54.

Figure 6:
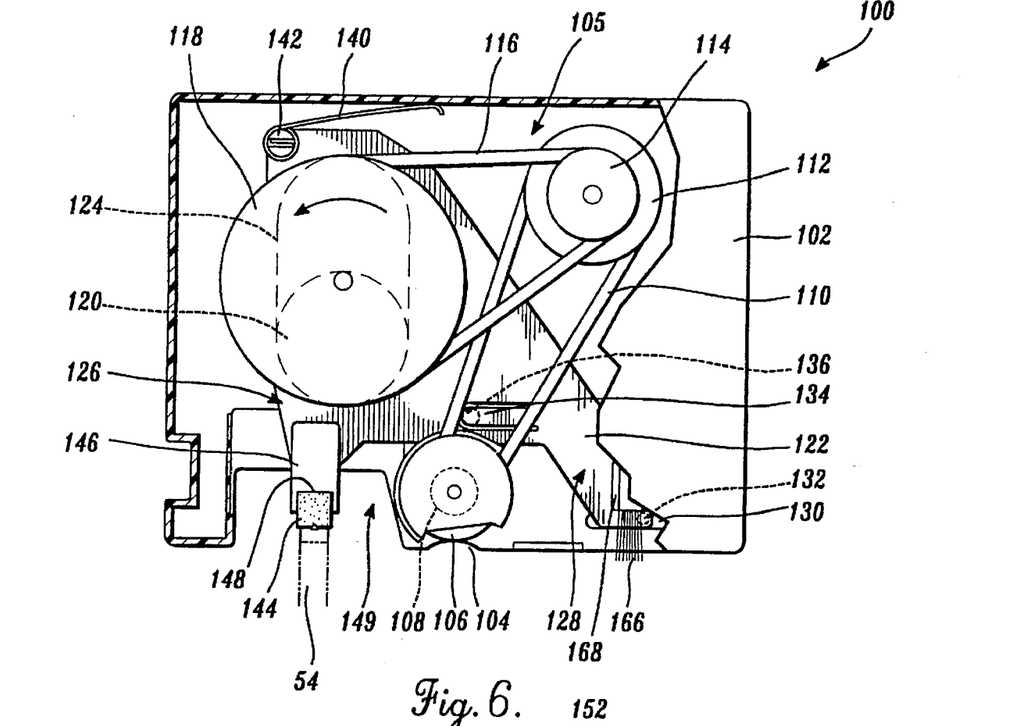
FIG. 6 is a top view of an alternate embodiment of the present invention that includes a carriage that moves in a circular path.
Figure 7:
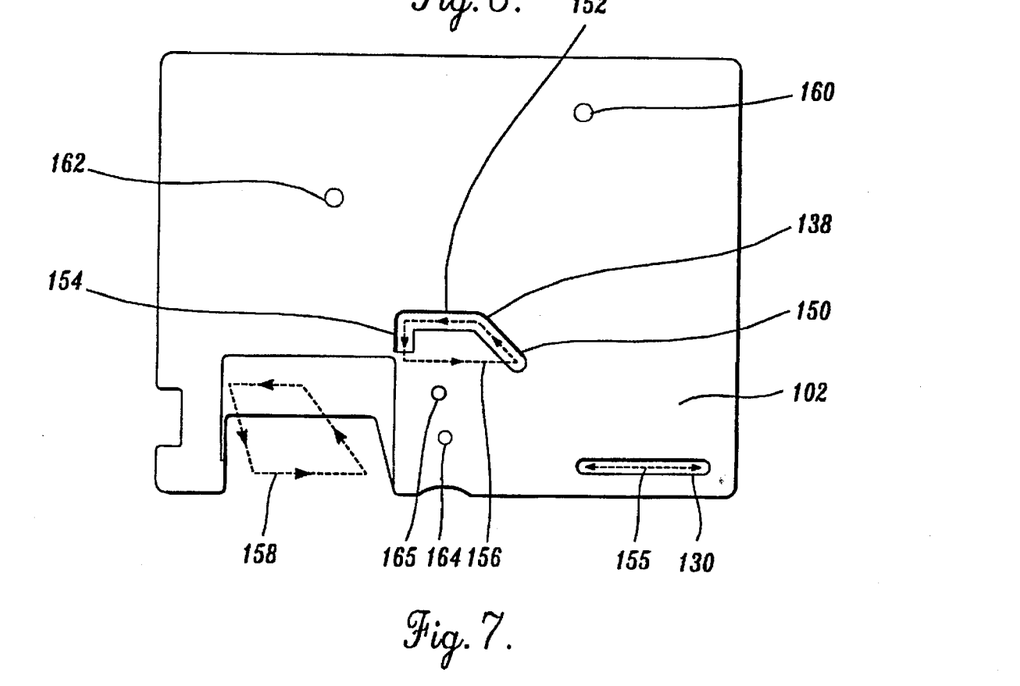
FIG. 7 is a view of the bottom wall of the embodiment illustrated in FIG. 6 showing the grooves and paths of movement of various portions of the carriage.

FIGS. 6 and 7 illustrate an alternate preferred embodiment of the present invention wherein the cleaning pad moves horizontally instead of vertically, but is also protected from damage or hang up on head 54. In this embodiment, a cleaning cartridge 100 is provided that includes a housing 102, a drive mechanism 105, a carriage 122, and a cleaning pad 144. Drive mechanism 105 transmits the rotating motion of the capstan from the tape backup drive into oscillating motion of cam 120. Cam 120 is engaged within a follower slot 124 provided within carriage 122, such that carriage 122 oscillates back and forth. Pad 144 is engaged with carriage 122 and, thus, oscillates therewith to clean head 54. However, the path of pad 144 is such that pad 144 only passes across and makes contact with head 54 in one direction as described below. Since pad 144 moves across the irregular surface of head 54 in only one direction, it is less likely to be destroyed or dislodged from carriage 122. Housing 102 is similar to housing 12 described above. Housing 102 is adapted to be received within a tape backup drive. A capstan opening 104 is provided in the front face of housing 102.

Drive mechanism 105 includes a drive wheel 106, a drive pulley 108, a first belt 110, a first intermediate pulley 112, a second intermediate pulley 114, a second belt 116, a terminal pulley 118, and a cam 120. The functioning of drive mechanism 105, as well as carriage 122 engaged therewith, is similar in many regards to the cleaning apparatus disclosed in U.S. Pat. No. 5,420,737 (by the same inventor), the disclosure of which is incorporated herewith. Drive wheel 106 is positioned near the middle of the front of housing 102, adjacent capstan opening 104, in order to be engaged with the capstan of the tape backup drive. Drive pulley 108 is fixed to the bottom of drive wheel 106 and rotates therewith along a common axis. First belt 110 is engaged with drive pulley 108 and extends rearwardly to the left rearward corner of housing 102, to engage first intermediate pulley 112, rotatably secured within housing 102. Second intermediate pulley 114 is fixed to the top of first intermediate pulley 112. Second intermediate pulley 114 is slightly smaller than first intermediate pulley 112 which is larger than drive pulley 108. Thus, speed reduction between the pulleys is accomplished. Second intermediate pulley 114 rotates about a common axis with first intermediate pulley 112.

Second belt 116 engages second intermediate pulley 114 as well as terminal pulley 118 positioned within the right side of housing 102. Terminal pulley 118 is somewhat larger than second intermediate pulley 114 to accomplish additional speed reduction. Cam 120 is preferably integrally molded to the bottom of terminal pulley 118 and extends downwardly therefrom. Both cam 120 and terminal pulley 118 rotate about the same axis through the center of terminal pulley 118. However, this axis is offset to the edge of cam 120, such that cam 120 does not rotate about its midpoint. Thus, the rotation of cam 120 provides oscillating motion to impart to carriage 122.

Carriage 122 is a plate-like member positioned adjacent to the bottom wall of housing 102 and slideably engaged within housing 102. Carriage 122 is somewhat triangular in shape with recesses being cut out to avoid elements such as drive pulley 108. Carriage 122 includes a right cleaning end portion, a left mounting portion, a cam follower slot 124, a follower post 132, a tab 134, and a pad holder 146. Follower post 132 is positioned near the front left corner of carriage 122, as well as housing 102. The follower post projects downwardly from the bottom of carriage 122 and is engaged within a first groove 130 within the bottom wall of housing 102. Follower post 132 thus rides within first groove 130 to oscillate back and forth within first groove 130. First groove 130 extends parallel to the forward wall of housing 102 about one-quarter of the length of forward wall. Thus, follower post 132 is one point of constraint of the motion of carriage 122 causing back and forth motion within housing 102.

A second point of constraint is provided by tab 134 riding within a second groove 138 (illustrated in FIG. 7) within the bottom wall of housing 102. Tab 134 includes a tab post 136 projecting downwardly therefrom. Tab 134 is formed by a "U" shaped cut out portion of the plate face of carriage 122, such that tab 134 acts as a spring member with tab post 136 projecting downwardly from the cantilevered end thereof. Tab post 136 rides within second groove and along the surface of bottom wall of housing 102 as described below.

FIG. 7 also illustrates the mounting holes for the various pulleys 108, 114, 112, and 118.

Spring 140 is provided at the rearward end of carriage 122 in order to bias carriage 122 forwardly such that cleaning pad 144 engages head 54. Spring 140 is secured to spring post 142 projecting upwardly from the right rearward corner of carriage 122. The end of spring 140 slides against the rearward wall of housing 102. The back and forth motion of carriage 122 is provided by the circular motion of cam 120 as it rides within follower slot 124 within the right side of carriage 122. The distance of the back and forth motion is determined by the size of cam 120 and its offset from its axis of rotation, as well as by the size of follower slot 124. However, the forward and rearward motion of carriage 122 is determined by tab post 136 riding within second groove 138.

A pad holder 146 is affixed to the right forward corner of carriage 122. Pad holder 146 includes a pad recess 148 into which cleaning pad 144 is engaged. Cleaning pad 144 is preferably an open cell foam that absorbs and holds a cleaning solution such as a hydrocarbon cleaning solution commonly used with cleaners. Pad holder 146 and cleaning pad 144 project within a cleaning member recess 149. This is the same recess into which head 54 projects.

As cam 120 causes carriage 122 to oscillate back and forth, second groove 138 causes carriage 122, as well as pad holder and pad 144, to move forwardly or rearwardly. Second groove 138 includes a first portion 150 that angles diagonally across a small portion of the middle of housing 102 from the left forward corner toward the right rearward corner. A second portion 152 extends from left to right across a small central portion of housing 102. Section portion 152 is parallel to the forward side of housing 102. The bottom surfaces of first and second portions 150 and 152 are parallel to the bottom wall of housing 102. A third portion 154 is finally provided that slopes up from second portion 152 to be level with the bottom wall of housing 102. Third portion 154 is generally perpendicular to second portion 152 and extends forwardly therefrom toward forward wall of housing 102.

The paths of movement of follower post 132 within first groove 130 and tab post 136 within second groove 138 are illustrated in FIG. 7. The resultant pad path 158 is also illustrated. As cam 120 rotates by operation of drive mechanism 105 when drive wheel 106 is engaged with the capstan of the drive unit, carriage 122 moves about according to the paths 155, 156, and 158.

Follower post 132 follows linear path 155 since it is constrained within linear first groove 130. However, as carriage 122 oscillates back and forth, tab post 136 drops within first portion 150 of second groove 138. As carriage 122 moves to the right of cleaning cartridge 100, first portion 150 guides tab post 136 rearwardly. This somewhat rearward motion of this portion of carriage 122 amplifies the rearward motion of cleaning pad 144 as shown by pad path 158, since there is no rearward motion of follower post 132 to the left of tab 134. As tab post 136 moves into second portion 152 of second groove 138, movement of cleaning pad 144 is simply to the right of housing 102. In this position, cleaning pad 144 is not in contact with head 54. As tab post 136 reaches third portion 154, spring 140 biases tab post 136 forwardly up the slope within second groove 138 and on to the main surface of the bottom portion of housing 102. Pad 144 then moves to the left as cam 120 continues to rotate within follower slot 124, and pad 144 wipes against the surface of head 54. Tab post 136 then drops within first portion 150 again to repeat the cycle. Guide post 165 is provided forwardly of second groove 138 and projects upwardly from the bottom of housing 102. Guide post 165 engages the forward side of carriage 122 such that the forward motion of cleaning pad 144 is somewhat restrained to an optimum position for wiping across the operating surface of head 54. Guide post 165 is positioned between carriage 122 and drive pulley 108.

A brush mount 168 and brush 166 is also attached to the left forward corner of carriage 122. Brush 166 functions to clean an electronic tape sensor opener as carriage 122 oscillates.

By the above-described operation, cleaning of the head 54 of the tape backup drive can be accomplished by wiping across the head in a single direction so as to avoid hang ups on the irregular surfaces of the head.

The operation has been described for particular use with a tape backup drive, however, the same or similar mechanism can be used with other media devices that include head surfaces or other elements with irregular surfaces to be cleaned, such as with a digital compact cassette. Thus, while the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An apparatus for cleaning a tape drive unit having a read and/or write head and a drive element, the apparatus comprising:
   (a) a housing arranged and configured to be received within a tape drive unit, said housing having top, bottom, and side walls, a forward side configured to oppose a head when the apparatus is received in a tape drive unit, and a rearward side opposite the forward side;
   (b) a vertically reciprocating head cleaner movably coupled within said housing, said head cleaner including: a cleaning element attached thereto for vertical movement with said head cleaner relative to said housing, said cleaning element being arranged and configured to contact a head of a tape drive unit when the apparatus is received in a tape drive unit; and
   (c) a drive mechanism coupled within said housing, said drive mechanism comprising:
      (1) a drive wheel configured to engage a drive element of a tape drive unit when the apparatus is received in a tape drive unit;
      (2) a cylindrical cam rotatably coupled to said housing about a substantially vertical axis, engaged with said head cleaner, and mounted for rotation by said drive wheel; and
      (3) a belt connected between said cam and said drive wheel, movement of a drive element of a tape drive unit in which the housing is receiving causing the cam to cause vertical reciprocation of said head cleaner.

2. The apparatus of claim 1, wherein said head cleaner includes a cleaner arm pivotally mounted within said housing about an axis generally parallel to the top and bottom walls of said housing, said cleaning element being disposed at one end of said cleaner arm.

3. The apparatus of claim 2, wherein said cleaning element is biased forwardly, in the direction of said forward side of said housing.

4. The apparatus of claim 3, wherein said cleaner arm includes a first portion pivotally mounted to said housing and a second portion slidably coupled to said first portion for forward and rearward movement with respect to said first portion, wherein a spring is disposed between said first and second portions to bias said second portion forwardly.

5. The apparatus of claim 1, wherein said head cleaner comprises a cleaning arm including a first portion pivotally secured to said housing about an axis substantially parallel to said bottom wall, said first portion including a tab engaging said cam, and a second portion extending forwardly from said first portion and holding said cleaning element.

6. The apparatus of claim 5, wherein said second portion of said arm is slidable with respect to said first portion, said arm further comprising a spring between said first and second portions biasing said second portion forwardly.

7. An apparatus for cleaning a tape drive unit having a read and/or write head and a capstan, the apparatus comprising:
   (a) a housing having top, bottom, side, forward and rearward walls, said housing being configured to be received within a tape drive unit;
   (b) a drive wheel engageable with a capstan, said drive wheel being rotatably secured within said housing about a generally vertical axis;
   (c) a head cleaner movably secured within said housing, said head cleaner including a cleaning element that moves vertically as said head cleaner moves, said head cleaner being operatively engaged to said drive wheel and said head cleaner including a cleaning arm comprising:
      (1) a first portion pivotally secured to said housing about an axis substantially parallel to said bottom wall, said first portion including a tab engaging said cam,
      (2) a second portion extending forwardly from said first portion and holding said cleaning element, said second portion of said arm being slidable with respect to said first portion, and (3) a spring between said first and second portions biasing said second portion forwardly; and (d) a cam rotatably secured within said housing and slidably engaged with said head cleaner.

8. The apparatus of claim 7, wherein said drive mechanism includes a drive wheel engageable with a drive element of a tape drive unit when the apparatus is received in a tape drive unit, and wherein said cam is mounted for rotation by said drive wheel.

9. The apparatus of claim 8, wherein said cam is a cylindrical cam rotatably coupled to said housing about substantially vertical axis.

10. The apparatus of claim 9, wherein said drive mechanism includes a belt coupled between said cylindrical cam and said drive wheel.

11. The apparatus of claim 8, further comprising a cam pulley secured to said cam for rotation therewith and a belt engaged on said pulley and coupled to said drive wheel.

12. The apparatus of claim 8, further comprising a cam gear secured to said cam for rotation therewith and an intermediate gear engaged with said cam gear and operatively coupled to said drive wheel.

13. An apparatus for cleaning a tape drive unit having a drive element and a read and/or write head, the apparatus comprising:

(a) a housing arranged and configured to be received within a tape drive unit, said housing having top, bottom, side, forward, and rearward walls, at least one of said top and bottom walls including a first groove therein, said first groove defining a continuous, closed path having both lateral and longitudinal components, first and second pairs of points, a forward path and a return path, said forward path extending between said first pair of points and said return path extending between said second pair of points and not along said first pair of points;

(b) a reciprocating carriage including a cleaning member selectively engageable with the head of a tape drive unit when the housing is in a tape drive unit, said carriage including a first guide post engageable with said first groove to follow said path as said carriage reciprocates; and (c) a drive mechanism engageable with a drive element of a tape drive unit and coupled to said carriage to move said carriage such that said guide post moves along said path;

said guide post, said first groove, said reciprocating carriage, said drive mechanism, and said cleaning member being arranged such that when said housing is in said tape drive unit and said drive mechanism causes said guide post to move along said path, said cleaning member engages and moves along a head of the tape drive unit as said guide post moves along said forward path of said first groove, and does not engage said head of the tape drive unit as said guide post moves along said return path.

14. The apparatus of claim 13, further comprising a second groove within at least one of said top or bottom walls, said second groove being substantially laterally oriented and a second post extending from said carriage and engageable with said second groove.

15. An apparatus for cleaning a tape drive unit having a read and/or write head defining first and second edges thereon and a capstan, the apparatus comprising:

(a) a housing having a top, bottom, side, forward and rearward walls, said housing being configured to be received within a tape drive unit;

(b) a reciprocating carriage having a cleaning member mounted thereon; and (c) a drive mechanism engageable with a capstan of a tape drive unit when the housing is in a tape drive unit and coupled to said carriage such that rotation of a capstan when the housing is in a tape drive unit causes said carriage to move in a reciprocating path, the reciprocating path being defined such that during the movement of the carriage said cleaning member engages the first edge of a head of a tape drive unit and wipes across the head to the second edge of the head, the cleaning head then moving away from the head and returning to engage the first edge of the head.

16. The apparatus of claim 15, wherein the drive mechanism comprises an eccentric cam that is rotated by the drive element when the housing is in a tape drive unit, and wherein the reciprocating carriage includes a cam follower slot for receiving the cam, the rotation of the eccentric cam causing the eccentric cam to move along the follower slot and to move the carriage in a reciprocating manner.

17. The apparatus of claim 16, wherein said eccentric cam is mounted on a drive wheel that is rotatably coupled to said housing about a substantially vertical axis.

18. The apparatus of claim 16, wherein said drive mechanism comprises (1) a first drive wheel that is engageable with a drive element of a tape drive unit; (2) a second drive wheel upon which is mounted the eccentric cam; and (3) a belt coupled between said first drive wheel and said second drive wheel.

19. The apparatus of claim 18, wherein said drive mechanism includes an intermediate drive wheel, and wherein a first belt extends between the second drive wheel and the intermediate drive wheel, and a second belt extends between the first drive wheel and the intermediate drive wheel.

20. The apparatus of claim 15, wherein the reciprocating carriage further comprises a spring for pressing the carriage toward the forward wall of the housing.

21. The apparatus of claim 15, wherein said housing comprises a first groove therein and said reciprocating carriage includes a first guide post engageable with first said groove to follow a path defined by said groove as said carriage reciprocates.

22. The apparatus of claim 21, further comprising (1) a second groove within at least one of said top or bottom walls, said second groove being substantially laterally oriented and (2) a second post extending from said carriage and engageable with said second groove.

23. The apparatus of claim 21, wherein the first groove defines a continuous loop path having a forward path and a return path, and wherein said guidepost, said first groove, said reciprocating carriage, and a cleaning member are arranged such that when said housing is in a tape drive unit and said guide post is moving along said path, said cleaning member engages and moves along said head of a tape drive unit as said guidepost moves along said forward path of said first groove, and does not engage said head of a tape drive as said guidepost moves along said return path.

24. An apparatus for cleaning a tape drive unit having a read and/or write head and a drive element, the apparatus comprising:

(a) a housing arranged and configured to be received within a tape drive unit, said housing having top, bottom, and side walls, a forward side configured to oppose a head when the apparatus is received in a tape drive unit, and a rearward side opposite the forward side;

(b) a vertically reciprocating head cleaner movably coupled within said housing, said head cleaner including:
  (1) a cleaning element attached thereto for vertical movement with said head cleaner relative to said housing, said cleaning element being arranged and configured to contact a head of a tape drive unit when the apparatus is received in a tape drive unit; and
  (2) a first portion pivotally secured to said housing about an axis substantially parallel to said bottom wall, said first portion including a cam follower attached thereto for vertical movement with said head cleaner;
  (3) a second portion extending forwardly from said first portion and holding said cleaning element, and wherein said second portion of said arm is slidable with respect to said first portion; and
  (4) a spring between said first and second portions biasing said second portion forwardly; and
(c) a drive mechanism coupled within said housing, said drive mechanism being configured to engage a drive element of a tape drive unit when the apparatus is received in a tape drive unit and the drive mechanism being configured to engage said cam follower and cause vertical reciprocation of said head cleaner when said housing is received within a tape drive unit.

25. An apparatus for cleaning a tape drive unit having a read and/or write head and a drive element, the apparatus comprising:

(a) a housing arranged and configured to be received within a tape drive unit, said housing having top, bottom, and side walls, a forward side configured to oppose a head when the apparatus is received in a tape drive unit, and a rearward side opposite the forward side;

(b) a vertically reciprocating head cleaner movably coupled within said housing, said head cleaner including: a cleaning element attached thereto for vertical movement with said head cleaner relative to said housing, said cleaning element being arranged and configured to contact a head of a tape drive unit when the apparatus is received in a tape drive unit; and (c) a drive mechanism coupled within said housing, said drive mechanism comprising:
  (1) a drive wheel configured to engage a drive element of a tape drive unit when the apparatus is received in a tape drive unit;
  (2) a cam mounted for rotation by the drive wheel and engaged with said head cleaner;
  (3) a cam gear secured to said cam for rotation therewith;
  (4) an intermediate gear engaged with said cam gear and operatively coupled to said drive wheel, movement of a drive element of a tape drive unit in which the housing is receiving causing the cam to cause vertical reciprocation of said head cleaner.

* * * * *

UNITED STATES PATENT AND TRADEMARK OFFICE
CERTIFICATE OF CORRECTION

PATENT NO. : 5,671,108
DATED : September 23, 1997
INVENTOR(S) : E. Clausen

It is certified that error appears in the above-identified patent and that said Letters Patent is hereby corrected as shown below:

| COLUMN | LINE | |
|---|---|---|
| [54] Pg. 1, col. 1 | Title | "TAPE DRIVE CLEANER" should read -- TAPE DRIVE UNIT HEAD CLEANING APPARATUS WHICH RECIPROCATES A CLEANING ELEMENT VERTICALLY OR ALONG THE CLOSED PATH-- |
| [56] Pg. 1, col. 1 | Refs. Cited (U.S. Pat. Docs., Item 18) | "d'alayer" should read --d'Alayer-- |
| 1 | 1 | "TAPE DRIVE CLEANER" should read -- TAPE DRIVE UNIT HEAD CLEANING APPARATUS WHICH RECIPROCATES A CLEANING ELEMENT VERTICALLY OR ALONG THE CLOSED PATH-- |
| 11 (Claim 9, | 13 line 2) | After "about" insert --a-- |
| 12 (Claim 23, | 52 line 4) | "a cleaning member" should read --said cleaning member-- |
| 12 (Claim 23, | 55 line 7) | "said head" should read --a head-- |

UNITED STATES PATENT AND TRADEMARK OFFICE
CERTIFICATE OF CORRECTION

PATENT NO. : 5,671,108
DATED : September 23, 1997
INVENTOR(S) : E. Clausen

It is certified that error appears in the above-identified patent and that said Letters Patent is hereby corrected as shown below:

COLUMN     LINE

12     57     "said head" should read --a head--
(Claim 23, line 9)

Signed and Sealed this

Fifth Day of May, 1998

Attest:

BRUCE LEHMAN

Attesting Officer     Commissioner of Patents and Trademarks